United States Patent Office 3,729,493
Patented Apr. 24, 1973

3,729,493
DI-(NITRODIPHENYLAMINESULFONAMIDO) COMPOUNDS
David H. Wilcox, Jr., Kingsport, Tenn., assignor to Eastman Kodak Company, Rochester, N.Y.
No Drawing. Filed Oct. 4, 1967, Ser. No. 672,709
Int. Cl. C07c *143/80*
U.S. Cl. 260—397.7         10 Claims

ABSTRACT OF THE DISCLOSURE

Water insoluble compounds prepared by condensing the product of a nitrochlorobenzene and a diamine with an aniline compound are useful as dyes for hydrophobic textile materials.

---

This invention relates to novel water-insoluble di(phenylaminonitrophenylsulfonamido) compounds, which are useful as dyes for hydrophobic textile materials.

The compounds of the invention have the general formula

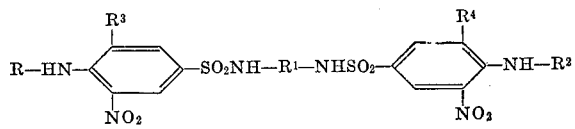

wherein

R and $R^2$ each represent a phenyl radical;
$R^1$ represents alkylene, cyclohexylene, lower alkylcyclohexylene, cyclohexylenedialkylene, or a phenylene radical; and
$R^3$ and $R^4$ each represent hydrogen or lower alkyl.

The nitrodiphenylamine compounds of the invention give yellow dyeings having high tinctorial properties and excellent sublimation fastness when applied to hydrophobic textile fibers, yarns and fabrics by conventional means. Fastness to sublimation is of particular importance in the dyeing of polyester fibers by the heat fixation technique during which the dye is submitted to temperatures as high as 410° C. Cellulose acetate, polyamide and polyester fibers are illustrative of the hydrophobic textile materials which can be dyed with the compounds of the invention. The compounds of the invention are water insoluble and therefore can be applied to hydrophobic textile materials by methods well known in the art of disperse dyes. Coloration of such textile materials can also be effected by incorporating the novel compounds into the dope or melt prior to spinning and then spinning the fiber as usual.

Illustrative of the groups represented by R and $R^2$ are phenyl, p-nitrophenyl, p-chlorophenyl, o-chloro-p-nitrophenyl, o-methylsulfonyl-p-nitrophenyl, 2,6-dichloro-4-nitrophenyl, p-acetylphenyl, p-cyanophenyl, p-tolyl, p-anisyl, p-sulfamoylphenyl, p-acetamidophenyl, o,p-dimethylsulfonylphenyl, 2,4 - dinitro - 6 - chlorophenyl, p-ethoxycarbonylphenyl, p-trifluoromethylphenyl, p-methylsulfonylphenyl, etc. A preferred group of the substituted phenyl radicals which R and $R^2$ can represent have the formula

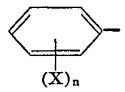

wherein X represents lower alkyl, e.g. having up to about 4 carbon atoms such as methyl, ethyl, propyl, isopropyl, butyl; lower alkoxy, e.g. having up to about 4 carbon atoms such as methoxy, ethoxy, butoxy; lower alkanoylamino, e.g. acetamido, propionamido; halogen, e.g. chloro, bromo; lower alkylsulfonyl, e.g. methylsulfonyl, butylsulfonyl; substituted lower alkylsulfonyl, such as cyanoalkylsulfonyl; lower alkoxycarbonyl, e.g. methoxycarbonyl, ethoxycarbonyl, butoxycarbonyl; carbamoyl, N-lower alkylcarbamoyl, e.g. N-methylcarbamoyl, N,N-di-lower alkylcarbamoyl, e.g. N,N-diethylcarbamoyl; phenyl; benzamido; lower alkanoyl, e.g. acetyl, propionyl, butyryl; sulfamoyl, N- and N,N-di-lower alkylsulfamoyl, e.g. N-propylsulfamoyl, N,N-diethylsulfamoyl, lower alkylsulfonamido, e.g. methylsulfonamido, ethylsulfonamido; thiocyanato; and lower alkylthio, e.g. methylthio, propylthio, and $n$ represents 1, 2, or 3. When $n$ is more than 1, the substituents represented by X can be the same or different.

Methyl, ethyl, propyl, isopropyl, etc., are typical alkyl groups which $R^3$ and $R^4$ can represent. Methylene, ethylene, propylene, isopropylene, butylene, isobutylene, amylene, hexamethylene, etc., are examples of the alkylene groups which $R^1$ can represent. Illustrative of the cyclohexylene groups that $R^1$ can represent are 1,4-cyclohexylene, 1,2-cyclohexylene, and 4-methyl-1,3-cyclohexylene. 1,4-cyclohexylenedimethylene, 1,3-cyclohexylenedimethylene, and 1,2-cyclohexylenediethylene are examples of the cyclohexylenedialkylene groups represented by $R^1$. The phenylene radical which $R^1$ can represent can be unsubstituted ortho-, meta-, or para-phenylene or substituted phenylene such as, for example, lower alkylphenylene, e.g. 3-methyl-1,4-phenylene; lower alkoxyphenylene, e.g. 2-methoxy-1,4-phenylene; halogen, e.g. 3-bromo-1,4-phenylene, 2-methoxy-6-chloro-1,3-phenylene; etc.

A particularly preferred group of the compounds of the invention conform to the formula

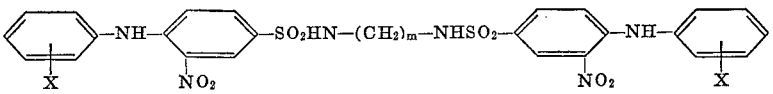

wherein X represents hydrogen, lower alkyl, lower alkoxy, or halogen and $m$ is 2 or 3.

The compounds of the invention are prepared by reacting approximately 2 moles of a 3-nitro-4-chlorobenzenesulfonyl chloride with about 1 mole of a diamine having the formula $H_2N—R^1—NH_2$, wherein $R^1$ is defined above, to obtain an intermediate di-(4-chloro-3-nitrophenylsulfonamido) compound. About one mole of the intermediate compound is then reacted with an aniline compound having the formula R—$NH_2$ and/or $R^2$—$NH_2$ to obtain the compounds of the invention. It is apparent that by reacting equimolar quantities of the intermediate compound and an aniline compound followed by the reaction of the resulting compound with a different aniline compound, unsymmetrical compounds can be obtained. Those skilled in the art will recognize that there are other methods by which the compounds of the invention can be prepared.

The diamines and anilines useful in preparing the compounds of the invention are well-known and are commercially available or can be prepared according to published techniques.

The following examples will serve to illustrate the preparation of representative intermediates and nitrodiphenylamine compounds of the invention.

EXAMPLE 1

To a solution of 12 grams of ethylenediamine and 67.2 grams of sodium bicarbonate dissolved in 400 ml. of water at 40° C., 108.4 grams of 3-nitro-4-chlorobenzenesulfonyl chloride (90% assay) is added portionwise. The reaction mixture is then heated to 60–65° C. for two hours, cooled to 15° C. and filtered. The filter cake is washed with water and slurried in a mixture of 80 ml. isopropanol and 160 ml. water. Then, 16.8 grams of sodium bicarbonate, 36 grams of aniline and 10 drops of piperidine are added and the reaction mixture is heated to reflux and held for 18 hours. The product is stirred at 15–20° C., filtered and washed. A yield of 79 grams of product are obtained. It has the formula:

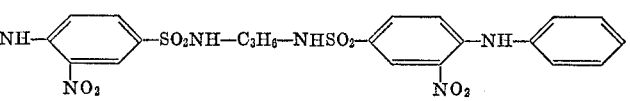

and dyes cellulose acetate, polyester, and polyamide textile material yellow shades of excellent sublimation fastness.

EXAMPLE 2

To a solution of 1 gram sodium ligninsulfonate in 200 ml. of water are added 52.1 grams of 3-nitro-4-chlorobenzenesulfonyl chloride (95% assay), 16.8 grams of sodium bicarbonate, and 14.8 grams of 1,2-propanediamine (propylenediamine). The mixture is heated to 65–70° C., held for two hours and cooled to 20° C. The mixture is then filtered and the filter cake is washed and slurried in 200 ml. water. One gram of sodium ligninsulfonate, 16.8 grams sodium bicarbonate, 18 grams aniline and 10 drops piperidine are added. The mixture is heated to reflux and held for 9 hours, filtered at 20° C., washed until the dye cake is alkali-free and dried. A yield of 57.5 grams of yellow dye is obtained. It has the formula:

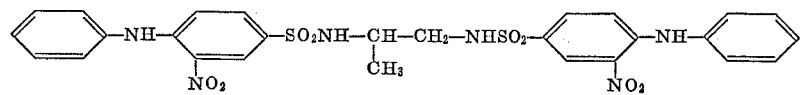

It colors cellulose acetate, polyester, and polyamide textile material yellow shades of good sublimation fastness.

EXAMPLE 3

In 200 ml. of water are dissolved one gram of sodium ligninsulfonate, 52.1 grams of 3-nitro-4-chlorobenzenesulfonyl chloride (95% assay) and 16.8 grams of sodium bicarbonate. Then 14.8 grams of 1,3-propanediamine are added and the mixture is heated at 65–70° C. for two hours. The mixture is cooled to 20° C., filtered and the filter cake is washed and slurried in 200 ml. of water. One gram of sodium ligninsulfonate, 16.8 grams of sodium bicarbonate, 18 grams of aniline and 10 drops of piperidine are added and the mixture is heated to reflux and held for 18 hours. The mixture is then cooled to 20° C., filtered and the yellow-orange filter cake is washed until alkali-free and dried. A yield of 59 grams of yellow dye is obtained. It has the formula:

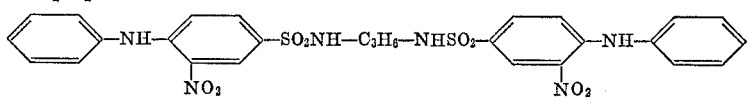

It colors cellulose acetate, polyester, and polyamide textile material yellow shades of good sublimation fastness.

EXAMPLE 4

In 200 ml. of water are dissolved one gram of sodium ligninsulfonate, 52.1 grams of 3-nitro-4-chlorobenzenesulfonyl chloride (95% assay), and 16.8 grams of sodium bicarbonate. Then, 17.8 grams of 1,3-diaminobutane is added and the mixture is heated at 65–70° C. for two hours. The mixture is then cooled to 20° C., the mother liquor is decanted and the insoluble material is dissolved in 70 ml., of hot isopropanol. The mixture is diluted with 140 ml. of water to obtain a fine crystalline slurry and one gram of sodium ligninsulfonate and 16.8 grams of sodium bicarbonate are added. Upon dissolution of the sodium bicarbonate, 18 grams of aniline and 10 drops of piperidine are added and the mixture is heated to reflux and held for 18 hours. The mixture is then cooled to 25° C., the mother liquor is decanted, 200 ml. of isopropanol are added and the mixture is heated to 80° C. The mixture is cooled to 15° C. to crystallize the dye which is then filtered, washed with water and dried. A yield of 53 grams of yellow dye is obtained. It has the formula:

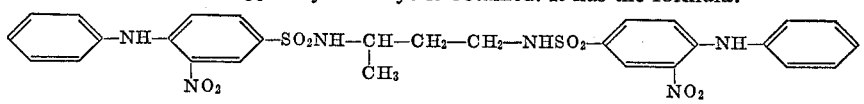

and colors cellulose acetate, polyester and polyamide textile material yellow shades of good sublimation fastness.

EXAMPLE 5

In 100 ml. of water are dissolved 5.8 grams of 1,6-hexanediamine and 16.8 grams of sodium bicarbonate. The mixture is heated to 40° C. and 27.1 grams of 3-nitro-4-chlorobenzenesulfonyl chloride (90% assay) are slowly added. The heating is raised and held at 60–65° C. for two hours. The mixture is cooled to 15° C., filtered and the filter cake is washed with water and slurried in 40 ml. of water and 20 ml. of isopropanol. To the mixture there is added 4.2 grams of sodium bicarbonate, 9 grams of aniline and 5 drops of piperidine. The mixture is heated to reflux and held for 18 hours.. It is then cooled to 15° C., filtered, the filter cake is washed with water until alkali-free and dried. A yield of 21.5 grams of yellow dye is obtained. It has the formula:

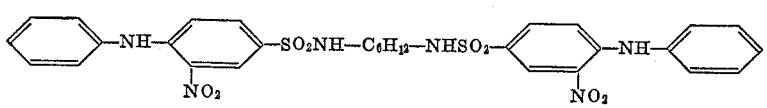

and colors cellulose acetate, polyester, and polyamide textile material yellow shades of good sublimation fastness.

The compounds described in the examples of the following table are prepared according to the procedures employed in Examples 1 through 5. The compounds of the table give yellow dyeings exhibiting excellent fastness to sublimation on polyester fibers and conform to the formula:

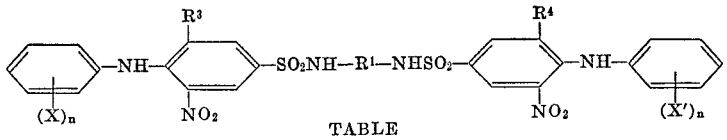

TABLE

| Example No. | (X)ₙ | R³ | R¹ | R⁴ | (X')ₙ |
|---|---|---|---|---|---|
| 6 | 4-CH₃ | H | —CH₂CH₂— | H | 4-CH₃ |
| 7 | 4-Cl | H | —CH₂CH₂— | H | 4-CH₃ |
| 8 | 4-NO₂ | H | —CH₂CH₂CH₂— | H | 4-NO₂ |
| 9 | 2-SO₂CH₃-4-NO₂ | H | —CH₂CH₂CH₂— | H | 2-SO₂CH₃-4-NO₂ |
| 10 | 4-CF₃ | H | —CH₂CH₂— | H | 4-CF₃ |
| 11 | 4-COOC₂H₅ | CH₃ | —CH₂CH₂— | CH₃ | 4-COOC₂H₅ |
| 12 | 4-COCH₃ | H | —CH₂CH₂CH₂— | H | 4-COCH₃ |
| 13 | 4-CN | H | —CH₂CH₂— | H | 4-CN |
| 14 | 2,4-di-NO₂-5-Cl | H | —CH₂CH₂— | H | 2,4-di-NO₂-5-Cl |
| 15 | 4-SO₂NH₂ | H | —CH₂CH₂— | H | 4-SO₂NH₂ |
| 16 | 4-NHCOCH₃ | CH₃ | —CH₂CH₂— | H | 4-NHCOCH₃ |
| 17 | H | CH₃ | —CH₂CH₂— | H | 3-CH₃ |
| 18 | 2,5-di-OCH₃ | H | —CH₂CH₂CH₂— | H | 2,5-di-OCH₃ |
| 19 | 2,4-di-SO₂CH₃ | H | —CH₂CH(CH₃)CH₂— | H | 2,4-di-SO₂CH₃ |
| 19 | 3-CH₃ | H | 1,4-phenylene | H | 3-CH₃ |
| 20 | H | H | 4-CH₃-1,3-phenylene | H | H |
| 21 | 4-CONH₂ | H | 1,4-cyclohexylene | H | 4-CONH₂ |
| 22 | H | H | 1-4-cyclohexylene-dimethylene | H | H |
| 23 | 3-CH₃ | H | —CH₂(CH₂)₄—CH₂— | H | H |
| 24 | 4-COCH₃-2-Cl | H | —CH₂(CH₂)₂—CH₂— | H | 4-COCH₃-2-Cl |

Since the novel compounds of the invention are water-insoluble, they do not contain water-solubilizing substituents such as sulfo, carboxyl, salts thereof, etc.

The compounds of the invention can be used for dyeing hydrophobic fibers such as linear polyester, cellulose ester, polyamide, etc., fibers in the manner described in U.S. Pats. 2,880,050, 2,782,187, 2,757,064, and 3,043,827. The following procedure illustrates how the compounds can be applied to hydrophobic textile materials by the carrier dyeing technique.

EXAMPLE 25

An amount of 0.1 g. of the dye is dissolved in the dye pot by warming in 5 cc. of ethylene glycol monomethyl ether. A 2% sodium-N-methyl-N-oleyl taurate and 0.5% sodium ligninsulfonate aqueous solution is added, with stirring, until a fine emulsion is obtained. Water is then slowly added to a total volume of 200 cc. Then, 3 cc. of Tanavol (an anionic solvent carrier) are added and 10 grams of a textile fabric made of poly (ethylene terephthalate) polyester fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried.

When the compounds are used to dye polyamide textile materials, the above described procedure can be employed except the Tanavol dyeing assistant need not be used. In dyeing fiber of partially hydrolyzed cellulose acetate, the above procedure can be used, omitting the Tanavol carrier and carrying out the dyeing at 80° C.

As mentioned hereinbefore, the compounds of the invention possess excellent fastness to sublimation when applied to polyester fibers. The following example describes a typical procedure for dyeing polyester fibers by the heat fixation technique in which fastness to sublimation is an important property of the dye compound used.

EXAMPLE 26

Ten g. of dye, 10 g. of glycerin, 6 g. of sodium ligninsulfonate, and 15 ml. of water are ground together in a ball mill. The paste is washed off the balls with 15 ml. of water. 3.5 g. of a nonionic surface active agent (Du Pont Compound No. 8-S) is added to 250 ml. of water at 190–200° F. To this solution is added slowly with stirring 20 g. of the above dye paste, 125 ml. of a 2% solution of sodium alginate thickener (Keltex, Kelco Company) with stirring to produce an even paste. 0.25 g. of a sodium hydrocarbonsulfate wetting agent (Alkanol WXN, Du Pont) is stirred into the paste and the volume is brought to 500 ml. with warm water. This paste is applied to a fabric consisting of 65% poly(ethylene terephthalate) and 35% cotton fibers by means of a conventional padder. The fabric is then dried and, in open width, heated in an oven for 90 seconds at 410° F. The fabric is then scoured at 175° F. in a bath containing 0.2% of a nonionic emulsifier such as a polyoxyethylated fatty alcohol (Emulphor ON-870, General Aniline and Film Corporation) and 0.2% soda ash, rinsed and dried.

Polymeric linear polyester materials of the terephthalate type are illustrative of the linear aromatic polyester textile materials that can be dyed with the new compounds of the invention. Examples of such linear polyester materials are those prepared from ethylene glycol and dimethylterephthalate and those prepared from 1,4-cyclohexanedimethanol and dimethylterephthalate. Polyester textile materials prepared from 1,4-cyclohexanedimethanol and dimethylterephthalate are more particularly described in U.S. Pat. 2,901,446. Poly(ethylene terephthalate) fibers are described, for example, in U.S. Pat. 2,465,319. The polymeric linear polyester materials disclosed in U.S. Pats. 2,945,010, 2,957,745, and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerizaiton of adipic acid and hexamethylenediamine, nylon 6, prepared from epsilon-aminocaproic acid lactam, and nylon 8.

The invention has been described in considerable detail with particular reference to certain preferred embodiments thereof, but it will be understood that variations and modifications can be effected within the spirit and scope of the invention as described above and as defined in the appended claims.

I claim:

1. A compound having the formula

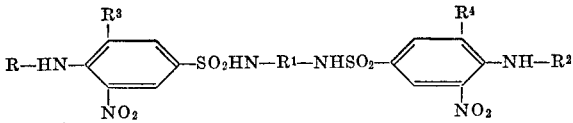

wherein

R and R² are the same or different and each represents a radical having the formula

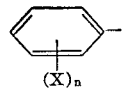

in which X represents hydrogen, lower alkyl, trifluoromethyl, cyano, nitro, lower alkoxy, lower alkanoylamino, chlorine, bromine, lower alkylsulfonyl, lower alkoxycarbonyl, carbamoyl, N-lower alkylcarbamoyl, N,N-di-lower alkylcarbamoyl, lower alkanoyl, sulfamoyl, N-lower alkylsulfamoyl, N,N-di-lower alkylsulfamoyl, lower alkylsulfonamido, or lower alkylthio, and $n$ is 1, 2 or 3;

$R^1$ represents alkylene of 1 to 6 carbon atoms, cyclohexylene, lower alkylcyclohexylene, cyclohexylenedi-lower-alkylene, phenylene, or phenylene substituted with lower alkyl, lower alkoxy, or halogen; and $R^3$ and $R^4$ are the same or different and each represents hydrogen or lower alkyl.

2. A compound according to claim 1 wherein R and $R^2$ each represent the same radical and X represents hydrogen, lower alkyl, lower alkoxy, lower alkylsulfonyl, or nitro.

3. A compound according to claim 2 wherein $R^3$ and $R^4$ represent hydrogen.

4. A compound according to claim 1 having the formula

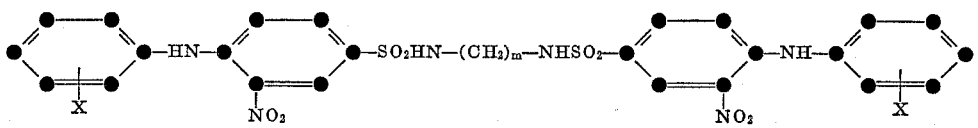

wherein X represents hydrogen, lower alkyl, lower alkoxy chlorine or bromine, and $m$ represents 2 or 3.

5. A compound according to claim 4 having the formula

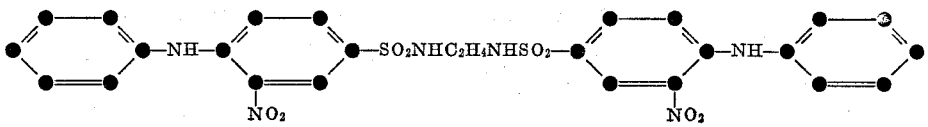

6. A compound according to claim 4 having the formula

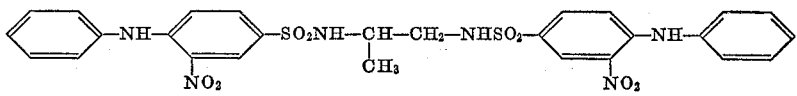

7. A compound according to claim 4 having the formula

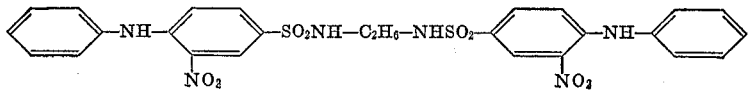

8. A compound according to claim 4 having the formula

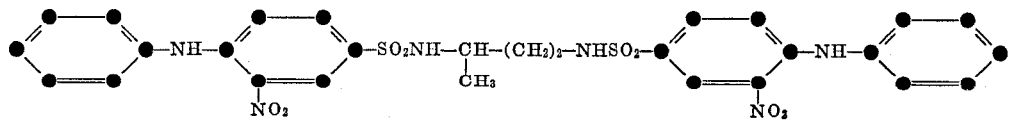

9. A compound according to claim 4 having the formula

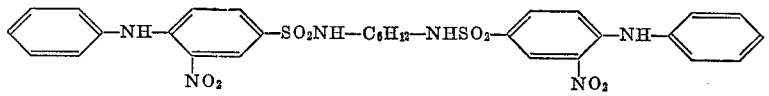

10. A compound having the formula

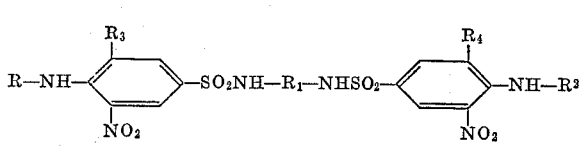

wherein $R_1$ represents alkylene of 1 to 6 carbon atoms, phenylene, or phenylene substituted with lower alkyl, lower alkoxy or halogen;

R and $R^2$ are the same or different and each represents a radical having the formula

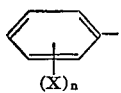

in which X represents hydrogen, lower alkyl, trifluoromethyl, lower alkoxy, chlorine, bromine, lower alkanoylamino, carbamoyl, sulfamoyl, N-lower alkylcarbamoyl, N,N-di-lower alkylcarbamoyl, N-lower alkylsulfamoyl, N,N-di-lower alkyl sulfamoyl, and $n$ is 1, 2, or 3;

$R^3$ and $R^4$ are the same or different and each represents hydrogen or lower alkyl.

References Cited
UNITED STATES PATENTS

| | | | |
|---|---|---|---|
| 1,915,334 | 6/1933 | Salzberg et al. | 260—243 |
| 2,075,359 | 3/1937 | Salzberg et al. | 424—250 |
| 2,258,162 | 10/1941 | Northey et al. | 260—397.7 |

HENRY R. JILES, Primary Examiner

S. D. WINTERS, Assistant Examiner

U.S. Cl. X.R.

8—1 C, 54.2, 178 R, 179, DIG. 4, DIG. 21; 260—556 B